Figure 1:
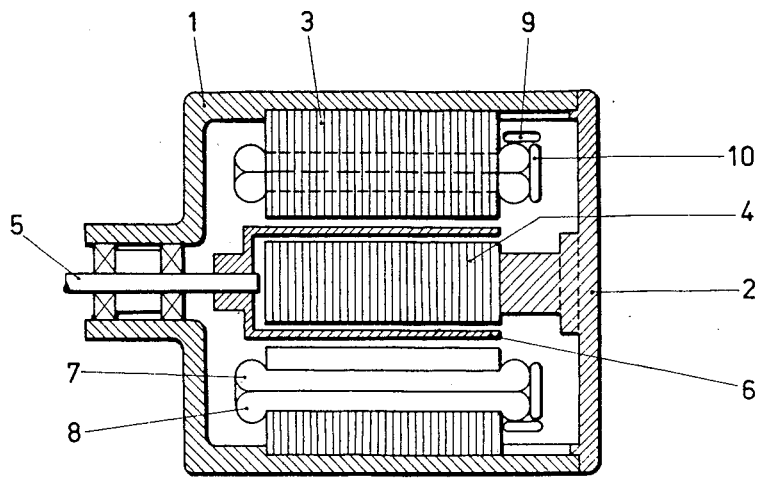

Oct. 25, 1960   J. L. BINGGELI   2,958,035
TWO-PHASE ASYNCHRONOUS GENERATOR
Filed April 29, 1959   2 Sheets-Sheet 1

INVENTOR,
JEAN LOUIS BINGGELI

INVENTOR,
JEAN LOUIS BINGGELI

— # United States Patent Office 2,958,035
Patented Oct. 25, 1960

2,958,035
TWO-PHASE ASYNCHRONOUS GENERATOR

Jean Louis Binggeli, Geneva, Switzerland, assignor to Contraves A.G., Zurich, Switzerland Filed Apr. 29, 1959, Ser. No. 809,885

Claims priority, application Switzerland May 3, 1958

4 Claims. (Cl. 322—76)

The present invention concerns tachometer devices, and particularly electric tachometer devices comprising a two-phase asynchronous generator asymmetrically excited by alternating current. A generator of this type is intended to produce an alternating voltage at the frequency of the exciter current. In order to arrive at ideal conditions, it is highly desirable that the amplitude of the generated alternating voltage is strictly proportional to the angular velocity of the driven rotor, independently of occurring changes of temperature and of fluctuations of the exciter current frequency.

In connection with Ferraris-type generators which have a rotor consisting of a cylinder made of copper or other conductive material and rotating within a cylindrical air gap separating the stator magnets, arrangements have been used in the past which yield quite satisfactory results in many fields of application. The "residual voltage," i.e. the output voltage produced when the rotor is started after having been at a stand-still, and caused by asymmetries of the structure of the magnetic field, can be reduced in such Ferraris-type generators by exceptionally careful construction and by the use of special field symmetrizing means to a tolerably small amount. Also, devices have been proposed to reduce the influence of temperature changes and of fluctuations of the exciter current frequency on the value of the output voltage.

However, according to the known state of the art, it appeared to be impossible to attain a strictly linear proportion between the amplitude of the output voltage and the angular velocity of the rotor. Fundamentally, the relation between the amplitude of the output voltage and the angular velocity of the rotor is bound to be non-linear. Therefore, the known means or methods for compensating temperature variations and fluctuations of frequency are effective only for certain points of the generator characteristic and, in addition, such compensation can be adjusted only individually for each single tachometer generator which involves comparatively great expenses.

In order to overcome these difficulties and drawbacks and in order to substantially improve the performance of generators of the type set forth, I have carefully examined the equivalent circuit of an asymmetrically-excited two-phase asynchronous generator. The present invention is the result of this investigation.

Consequently, a two-phase asynchronous generator according to the invention comprises means constituting a complex impedance connected in circuit with the exciter windings of the generator for compensating the non-linear relation, caused by internal impedances of the generator, between the rotary speed of the rotor and the generator output voltage during idling.

Figure 2:
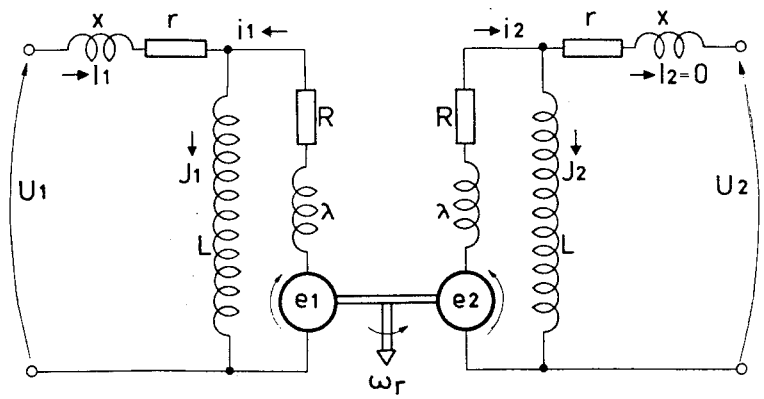
Figure 3:
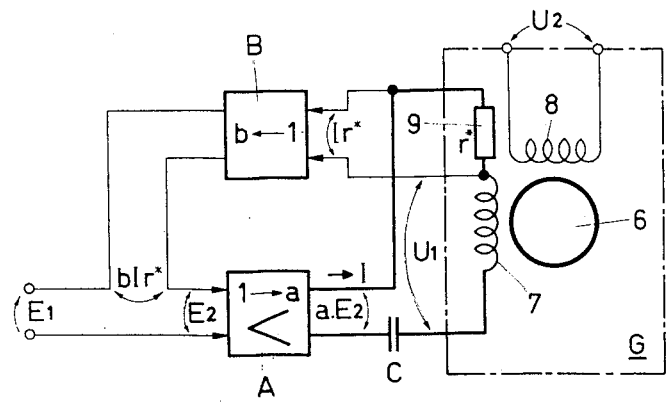
Figure 4:
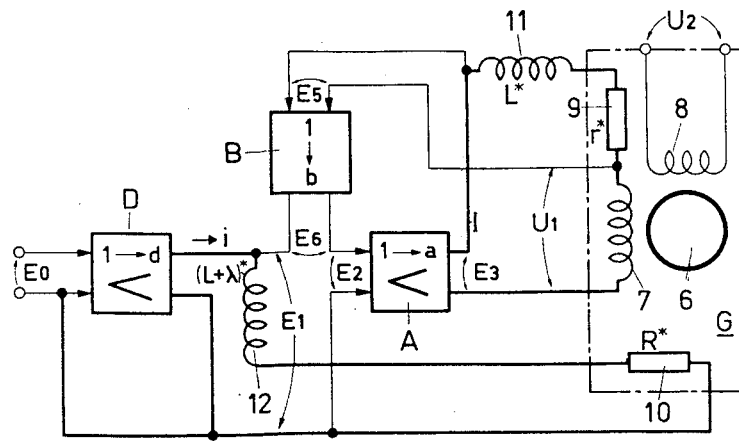

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings, in which:

Fig. 1 is an axial section of a Ferraris-type generator;
Fig. 2 is an equivalent circuit of a two-phase asynchronous generator, capacitances and ion losses being omitted;
Fig. 3 illustrates in the form of an equivalent circuit a simple embodiment of the invention; and
Fig. 4 is a similar illustration of a more elaborate embodiment of the invention.

Referring now to Fig. 1, the Ferraris-type generator illustrated therein comprises a housing 1 closed by a cover 2, an outer stator ring 3 and an inner stator cylinder 4, each of these stator members being a stack of laminations of magnetic sheet metal. A cylindrical tubular rotor member 6 carried by a rotatably supported drive shaft 5 and made of conductive material, e.g. copper, is arranged to be capable of rotating within a cylindrical air gap separating the stator members 3 and 4. The stator ring 3 is provided in conventional manner along its inner surface with axially extending grooves which accommodate two substantially identically formed groups of windings 7 and 8 which are angularly offset 90° with respect to each in such a manner that the two-phase asynchronous generator has $p$ pairs of poles. Fig. 2 is an equivalent circuit representing such a machine except for the omission of capacitances, of ion losses and of such asymmetries which can be corrected by construction.

In Fig. 2 and in the following pertaining calculations the symbols used therein have the following meaning:

$U1$ = the input alternating voltage (exciter voltage) appearing at the terminals of the exciter winding 7 of the generator;
$I1$ = the input current (exciter current) of the generator;
$U2$ = the output alternating voltage of the generator appearing at the terminals of the secondary winding 8, at the same frequency as that of the input voltage $U1$;
$I2 = 0$ the output alternating current having the same frequency as the input current $I1$ of the generator; its value is made 0 because it will be assumed that the generator is idling;
$x$ = the stray inductances of the two generator windings 7 and 8;
$r$ = the ohmic resistances of the two generator windings 7 and 8;
$L$ = the effective air gap inductances of the two windings;
$\lambda$ = the stray inductance of the rotor;
$R$ = the ohmic resistance of the rotor;
$p$ = the number of pairs of poles of the generator;
$\omega r$ = the angular velocity of the rotor;
$\omega = 2\pi f$; the exciter current frequency in radians;
$J1$ = the primary current appearing in the air gap inductance;
$J2$ = the secondary current appearing in the air gap inductance;
$i1 = J1 - I1$: the primary component of the rotor current;
$i2 = J2$: the secondary component of the rotor current;
$e1 = (J2L + i2\lambda)p\omega_r = i2(L+\lambda)p\omega_r$
$e2 = (J1L + i1\lambda)p\omega_r = -[i1(L+\lambda) + I1L]p\omega_r$. $e1$ and $e2$ are the internal sources of potential on the primary and secondary side of the generator, respectively.

The following relations can be read directly from the equivalent circuit Fig. 2:

$I1 \cdot j\omega x + I1r + I1j\omega L + i1j\omega L = -U1$
$I1 \cdot j\omega L + i1j\omega \lambda + i1R + i1j\omega L = -e1$
$i2 \cdot j\omega L + i2 \cdot R + i2j\omega \lambda = -e2$ Using the above definitions for the internal sources of potentials $e1$ and $e2$, the following equations for defining the currents $I1$, $i1$, $i2$ are obtained:

$$I1 \cdot (j\omega x + j\omega L + r) + i1 \cdot j\omega L = -U1$$
$$I1 \cdot j\omega L + i1 \cdot (j\omega L + j\omega \lambda + R) + i2 \cdot (L+\lambda) p\omega_r = 0$$
$$-I1 \cdot Lp\omega_r - i1(L+\lambda)p\omega_r + i2 \cdot (j\omega\lambda + j\omega L + R)p\omega_r = 0$$

The following terms are used for the purpose of simplification:

$$p \cdot \omega_r = \Omega; \quad \omega(x+L) = X1; \quad \omega(L+\lambda) = X2$$

Now, the above equations read as follows:

$$I1 \cdot (r+jX1) + i1 \cdot j\omega L = -U1$$

$$I1 \cdot j\omega L + i1 \cdot (R+jX2) + i2 \cdot X2\frac{\Omega}{\omega} = 0$$

$$-I1 \cdot \Omega L - i1 \cdot X2\frac{\Omega}{\omega} + i2 \cdot (R+jX2) = 0$$

From this results the following equation defining $$i2 = \frac{-U1 R\Omega L}{(r+jX1) \cdot (R+jX2)^2 + \omega^2 L^2 \cdot (R+jX2) - X2\Omega^2 \cdot \left(jL^2 - X2\frac{r+jX1}{\omega 2}\right)}$$

Since $U2 = -j\omega L \cdot i2$, $$U2 = \frac{+U1 \cdot jR\Omega L^2}{(r+jX1) \cdot (R+jX2)^2 + \omega^2 L^2 \cdot (R+jX2) - X2\Omega^2 \cdot \left(jL^2 - X2\frac{r+jX1}{\omega 2}\right)}$$

The requirement is that $U2$ is strictly proportional to $\Omega$. This however can only be the case when the denominator is independent of $\Omega$, i.e. when $$X2\Omega^2 \left(jL^2 - X2\frac{r+jX1}{\omega 2}\right) = 0$$

Assuming $X2 \neq 0$ and $\Omega \neq 0$, $X2 \cdot (r+jX1) = j\omega^2 L^2$, i.e. $r=0$ and $X1X2 = \omega^2 L^2$ or $$x = \frac{L\lambda}{L+\lambda}$$

Under these conditions, I obtain $$U2 = \frac{+U1jR\Omega X1X2}{\omega[(0+jX1) \cdot (R+jX2)^2 + X1X2(R+jX2) + 0]}$$

$$= \frac{+U1jR\Omega X1X2}{\omega(R+jX2)[(jX1R - X1X2 + X1X2)]}$$

$$= \frac{+U1\Omega X2}{\omega(R+jX2)} \quad \frac{+U1\Omega(L+\lambda)}{R+j\omega(L+\lambda)}$$

The above indicated conditions for such a proportionality between the output voltage and the value $\Omega = p \cdot \omega_r$ can be realized only by connecting in series with the generator a complex compensation impedance having an ohmic resistance component $-r$ and an inductive reactance component $$x = \frac{L\lambda}{L+\lambda}$$

A simple possibility of realizing the above expounded principle is illustrated by the equivalent circuit diagram Fig. 3. The components shown inside the dash-dotted frame represent the generator G according to Fig. 1, the rotor being indicated by 6, the exciter winding by 7, and the output winding by 8. The exciter winding 7 is connected in series with a compensating resistance 9 consisting of conductive material of the same type as that of the exciter winding, consequently preferably made of copper wire. The value of the resistance 9 is $r^*$. The potential at the output of a voltage amplifier A is applied to the series-combination comprising the resistance $r^*$, the generator input impedance $Zg$ appearing at the terminals of the winding 7, and the capacitive impedance $$Zc = \frac{1}{jC}$$

the amplification ratio of the amplifier A, in the direction of the arrow, is $1:a$.

Consequently, the current $I$ in the output circuit of the amplifier A is $$I = aE2 \frac{1}{Zc+Zg+r^*}$$

wherein $E2$ is the input voltage at the input terminals of the amplifier $A$.

The partial potential $Ir^*$ appearing across the compensating resistance $r^*$ is fed back additively to the input of the amplifier A via a quadripole B having, in direction of the arrow, an amplification ratio $1:b$, so that the input voltage of the amplifier A is $$E2 = E1 + b \cdot I \cdot r^*$$

wherein $E1$ is an alternating potential adjustable to a constant value. Under these conditions the following relation prevails $$I = \frac{a(E1+bIr^*)}{Zc+Zg+r^*}$$

and consequently $$I = \frac{aE1}{Zc+Zg+r^*(1-ab)}$$

provided that $r^* \cdot (1-ab) = -r$, and provided further that the capacitance C is chosen to be $$C = \frac{1}{\omega^2 \left[\frac{L\lambda}{L+\lambda} + x\right]}$$

the current is $$I = \frac{aE1}{-j\omega\left[\frac{L\lambda}{L+\lambda}+x\right] - r + Zg}$$

This shows that the generator impedance $Zg$ is connected in series with a compensating impedance $$Zk = -\left[\gamma\omega\frac{L\lambda}{L+\lambda}+x\right] - r$$

substantially equal to $$-r - j\omega\left(x + \frac{L\lambda}{L+\lambda}\right)$$

In this manner, the conditions for linearizing the generator output voltage are met with the result that $$U2 = a \cdot E1 \cdot \Omega \frac{L+\lambda}{R+j\omega(L+\lambda)}$$

Therefore, as long as $E1$ remains constant and as long as the sum of inductances $L+\lambda$ and the values R and $\omega$ remain unchanged, the output voltage $U2$ is bound to be strictly proportional to $\Omega$, i.e. the angular velocity of the rotor.

A more elaborate embodiment of the invention is illustrated by the equivalent circuit diagram Fig. 4. The components of the generator G, again shown within the dash-dotted frame, comprise the rotor 6, the exciter winding 7, and the output winding 8. Moreover, there are provided two resistors 9 and 10 which are made of the same conductive material as the exciter winding 7 and the rotor 6, respectively, and have the resistance values $r^*$ and $R^*$, respectively.

A voltage amplifier A being an active quadripole is provided in the circuit and is chosen so that its output potential E3 in relation to its input potential E2 satisfies the equation $E3=aE2$, the amplification ratio in the direction of the arrow being $1:a$.

In the output circuit of the amplifier A are connected in series an inductance 11 having the value $L^*$, the above mentioned first compensating resistance 9 having the value $r^*$, and the input impedance Zg appearing at the input terminals of the input winding 7 of the generator G.

Consequently, the current I in the primary winding 7 of the generator has the value $$I=\frac{E3}{j\omega L^*+r^*+Zg}$$

The partial potential $E5=I(j\omega L^*+r^*)$ appearing at the ends of the series-combination 11 and 9 is fed back additively to the input terminals of the amplifier A via a quadripole B having a voltage amplification ratio $1:b$, in the form of a potential $E6=bE5$ so that the input voltage of the amplifier A is $E2=E1+bE5$.

Under these circumstances, the following relations prevail $$I=\frac{aE1+abI(j\omega L^*+r^*)}{j\omega L^*+r^*+Zg}$$

and $$I=\frac{a\cdot E1}{Zg+j\omega L^*(1-ab)+r^*(1-ab)}$$

and provided that $$L^*(1-ab)=-\left[\frac{L\lambda}{L+\lambda}+x\right]$$

the current is $$I=\frac{a\cdot E1}{Zg-j\omega\left[x+\frac{L\lambda}{L+\lambda}\right]-r}$$

and the voltage $$E1=[R^*+j\omega(L+\lambda)^*]$$

This shows that the generator impedance Zg is connected in series with a compensating impedance $$-j\omega\left[\frac{L\lambda}{L+\lambda}+x\right]-r$$

Consequently, the conditions for linearizing the generator output voltage are met, with the result that $$U2=a\cdot E1\cdot\Omega\frac{L+\lambda}{R+j\omega(L+\lambda)}$$

i.e. a linear relation between the generator output voltage U2 and the angular velocity of the rotor. Since, however, the values R and $\omega(L+\lambda)$ in the denominator are dependent on temperature and frequency, the voltage E1 is produced in the form of $$E1=i[R^*+j\omega(L+\lambda)]$$

due to the inclusion of a second compensating resistance 10 having the value $R^*=kR$ and of a second compensating inductance 12 having the value $(L+\lambda)^*=k$. $(L+\lambda)$, wherein $i$ is the constant output current of an amplifier D, this current being $i=dEo$, d being the current amplification factor of the amplifier D and Eo being the alternating exciter voltage adjustable to a constant value, k being a constant coefficient.

The result of this arrangement is that the generator output voltage during idling, independent of frequency and temperature changes, and linear with respect to $\Omega=p\omega_r$, is $$U2=a\cdot k\cdot dEo\Omega(L+\lambda)$$
$$=K\cdot Eo\Omega(L+\lambda)$$

wherein $K=a\cdot k\cdot d$.

It is easily possible to compensate by conventional means unavoidable loss resistances of the compensating inductances 11 and 12.

It will be understood that each of the elements described above, or two or more together, may also find a useful application in other types of asynchronous generators differing from the type described above.

While the invention has been illustrated and described as embodied in a two-phase asynchronous generator, particularly in an electric tachometer, it is not intended to be limited to the details shown, since various modifications and structural changes may be made without departing in any way from the spirit of the present invention.

Without further analysis, the foregoing will so fully reveal the gist of the present invention that others can by applying current knowledge readily adapt it for various applications without omitting features that, from the standpoint of prior art, fairly constitute essential characteristics of the generic or specific aspects of this invention and, therefore, such adaptations should and are intended to be comprehended within the meaning and range of equivalence of the following claims.

What is claimed as new and desired to be secured by Letters Patent is:

1. In a two-phase asynchronous generator arrangement, particularly in an electric tachometer, in combination, outer and inner stator windings and stator magnets separated by a cylindrical air gap; exciter windings adjacent to said outer stator windings; cylindrical rotor means rotatably arranged in said air gap; and means constituting a complex impedance connected in circuit with said exciter windings for compensating the non-linear relation, caused by internal impedances of the generator, between the rotary speed of said rotor and the generator output voltage during idling, so that said relation becomes substantially linear, the total value Zk of said complex impedance being determined in relation to the known characteristics of the generator by $$Zk\approx-r-j\omega\left(x+\frac{L\lambda}{L+\lambda}\right)$$

wherein $r=$loss resistance of the exciter winding,
$x=$stray inductance of the exciter winding,
$L=$air gap inductance,
$\lambda=$stray inductance of the rotor,
$\omega=$exciter current frequency in radians.

2. In a two-phase asynchronous generator arrangement, particularly in an electric tachometer, in combination, a housing; outer and inner stator windings and stator magnets in said housing and separated by a cylindrical air gap; exciter windings adjacent to said outer stator windings; cylindrical rotor means rotatably arranged in said air gap; means constituting a complex impedance connected in circuit with said exciter windings for compensating the non-linear relation, caused by internal impedances of the generator, between the rotary speed of said rotor and the generator output voltage during idling, so that said relation becomes substantially linear, said complex impedance means comprising a compensating resistor made of the same conductive material as the exciter winding and mounted within said housing, and a capacitor means of the magnitude $$C \approx \frac{1}{\omega^2\left[\frac{L\lambda}{L+\lambda}+x\right]}$$

said compensating resistor and said capacitor means being connected to form a series combination with said exciter winding; first voltage amplifier means in circuit with said series combination for causing the flow of an exciter current therethrough; second voltage amplifier means in circuit with said compensating resistor means for amplifying the alternating potential difference appearing across said compensating resistor; circuit means for additively feeding back said amplified potential difference to the input of said first amplifier means; and a source of alternating potential connected in series with the amplified output of said second amplifier means for applying its own alternating potential plus the fed-back amplified alternating potential difference as an input potential to said first amplifier means, the dimensions of said various means being chosen in such a manner that the exciter current is $$I \approx \frac{aE1}{Zg-j\omega\left[\frac{L\lambda}{L+\lambda}+x\right]-r}$$

wherein $E1$=input potential of the first voltage amplifier means,
$a$=amplification factor of the first amplifier means,
$Zg$=input impedance at the terminals of the exciter winding,
$j=\sqrt{-1}$
$\omega$=exciter current frequency in radians,
$L$=air gap inductance,
$\lambda$=stray inductance of the rotor,
$x$=stray inductance of the exciter winding,
$r$=loss resistance of the exciter winding.

3. In a two-phase asychronous generator arrangement, particularly in an electric tachometer, in combination, a housing; outer and inner stator windings and stator magnets in said housing and separated by a cylindrical air gap; exciter windings adjacent to said outer stator windings; cylindrical rotor means rotatably arranged in said air gap; means constituting a complex impedance connected in circuit with said exciter windings for compensating the non-linear relation, caused by internal impedances of the generator, between the rotory speed of said rotor and the generator output voltage during idling, so that said relation becomes substantially linear, said complex impedance means comprising a compensating resistor made of the same conductive material as the exciter winding and mounted within said housing, and a compensating inductance means, said compensating resistor and said compensating inductance means being connected to form a series combination with said exciter winding; first voltage amplifier means in circuit with said series combination for causing the flow of an exciter current therethrough; second voltage amplifier means in circuit with said compensating resistor means for amplifying the alternating potential difference appearing across said series combination of compensating resistor and compensating inductance means as $I(r^*+j\omega L^*)$, wherein $r^*$ is the value of said compensating resistor and $L^*$ the value of said compensating inductance means; circuit means for additively feeding back said amplified potential difference to the input of said first amplifier means; and a source of alternating potential connected in series with the amplified output of said second amplifier means for applying its own alternating potential plus the fed-back amplified alternating potential difference as an input potential to said first amplifier means, the dimensions of said various means being chosen in such a manner that the exciter current is $$I \approx \frac{aE1}{Zg-j\omega\left[\frac{L\lambda}{L+\lambda}+x\right]-r}$$

wherein $E1$=input potential of the first voltage amplifier means,
$a$=amplification factor of the first amplifier means,
$Zg$=input impedance at the terminals of the exciter winding,
$j=\sqrt{-1}$
$\omega$=exciter current frequency in radians,
$L$=air gap inductance,
$\lambda$=stray inductance of the rotor,
$x$=stray inductance of the exciter winding,
$r$=loss resistance of the exciter winding.

4. A generator as specified in claim 3, wherein said source of alternating potential includes means for adjusting its current output to a predetermined value, and a second series combination composed of a frequency compensating inductance means and a temperature compensating resistor, the latter being made of the same conductive material as said rotor and being arranged within said housing, the potential across said second series-combination constituting said alternating potential supplied by said source, whereby the output voltage of said generator is rendered frequency-independent and temperature-independent.

References Cited in the file of this patent

UNITED STATES PATENTS

| | | |
|---|---|---|
| 1,181,270 | Varley | May 2, 1916 |
| 2,206,920 | Riggs | July 9, 1940 |